(12) United States Patent
Kovalev et al.

(10) Patent No.: US 11,557,753 B2
(45) Date of Patent: Jan. 17, 2023

(54) ION-CONDUCTIVE COMPOSITE FOR ELECTROCHEMICAL CELLS

(71) Applicants: Sion Power Corporation, Tucson, AZ (US); BASF SE, Ludwigshafen (DE)

(72) Inventors: Igor P. Kovalev, Vail, AZ (US); Veronika G. Viner, Tucson, AZ (US); David L. Coleman, Corona De Tucson, AZ (US); Yuriy V. Mikhaylik, Tucson, AZ (US); Christine Bunte, Mannheim (DE)

(73) Assignee: Sion Power Corporation, Tucson, AZ (US)

( * ) Notice: Subject to any disclaimer, the term of this patent is extended or adjusted under 35 U.S.C. 154(b) by 846 days.

(21) Appl. No.: 14/918,672

(22) Filed: Oct. 21, 2015

(65) Prior Publication Data
US 2016/0118651 A1 Apr. 28, 2016

Related U.S. Application Data

(60) Provisional application No. 62/067,598, filed on Oct. 23, 2014.

(51) Int. Cl.
| | |
|---|---|
| *H01M 4/36* | (2006.01) |
| *H01M 50/44* | (2021.01) |
| *H01M 4/38* | (2006.01) |
| *H01M 4/62* | (2006.01) |
| *H01M 50/446* | (2021.01) |

(Continued)

(52) U.S. Cl.
CPC ......... *H01M 4/366* (2013.01); *H01M 4/0402* (2013.01); *H01M 4/382* (2013.01); *H01M 4/602* (2013.01); *H01M 4/628* (2013.01); *H01M 50/446* (2021.01); *H01M 4/624* (2013.01); *H01M 4/626* (2013.01); *H01M 10/052* (2013.01); *H01M 2004/021* (2013.01)

(58) Field of Classification Search
None
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |

(Continued)

FOREIGN PATENT DOCUMENTS

| | | |
|---|---|---|
| CN | 1820383 A | 8/2006 |
| CN | 101436655 A | 5/2009 |

(Continued)

OTHER PUBLICATIONS

Hayashi et al., Electronic Materials Letters. Invited Paper: Recent Development of Bulk-Type Solid-State Rechargeable Lithium Batteries with Sulfide Glass-ceramic Electrolytes. Apr. 2012;8(2):199-207.

(Continued)

*Primary Examiner* — Jonathan Crepeau
*Assistant Examiner* — Angela J Martin
(74) *Attorney, Agent, or Firm* — Wolf, Greenfield & Sacks, P.C.

(57) ABSTRACT

Articles and methods including composite layers for protection of electrodes in electrochemical cells are provided. In some embodiments, the composite layers comprise a polymeric material and a plurality of particles.

26 Claims, 3 Drawing Sheets

(51) Int. Cl.
*H01M 4/04* (2006.01)
*H01M 4/60* (2006.01)
H01M 4/02 (2006.01)
H01M 10/052 (2010.01)

(56) References Cited

U.S. PATENT DOCUMENTS

| | | | |
|---|---|---|---|
| 4,833,048 A | 5/1989 | DeJonghe et al. | |
| 4,917,974 A | 4/1990 | DeJonghe et al. | |
| 4,954,371 A | 9/1990 | Yializis | |
| 5,162,175 A | 11/1992 | Visco et al. | |
| 5,194,341 A | 3/1993 | Bagley et al. | |
| 5,324,599 A | 6/1994 | Oyama et al. | |
| 5,441,831 A | 8/1995 | Okamoto et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,601,947 A | 2/1997 | Skotheim et al. | |
| 5,648,187 A | 7/1997 | Skotheim | |
| 5,681,615 A | 10/1997 | Affinito et al. | |
| 5,690,702 A | 11/1997 | Skotheim et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,853,917 A | 12/1998 | Fauteux et al. | |
| 5,882,819 A | 3/1999 | Naoi et al. | |
| 5,919,587 A | 7/1999 | Mukherjee et al. | |
| 5,961,672 A | 10/1999 | Skotheim et al. | |
| 6,087,045 A * | 7/2000 | Fauteux | H01M 10/0565 |
| | | | 29/623.5 |
| 6,117,590 A | 9/2000 | Skotheim et al. | |
| 6,153,337 A | 11/2000 | Carlson et al. | |
| 6,201,100 B1 | 3/2001 | Gorkovenko et al. | |
| 6,214,061 B1 | 4/2001 | Visco et al. | |
| 6,306,545 B1 | 10/2001 | Carlson et al. | |
| 6,365,299 B1 | 4/2002 | Miyaki et al. | |
| 6,413,284 B1 | 7/2002 | Chu et al. | |
| 6,413,285 B1 | 7/2002 | Chu et al. | |
| 6,432,584 B1 | 8/2002 | Visco et al. | |
| 6,566,006 B1 * | 5/2003 | Cheng | H01M 4/02 |
| | | | 252/519.34 |
| 6,737,197 B2 | 5/2004 | Chu et al. | |
| 7,070,632 B1 | 7/2006 | Visco et al. | |
| 7,160,603 B2 | 1/2007 | Carlson | |
| 7,175,937 B2 | 2/2007 | Cho et al. | |
| 7,247,408 B2 | 7/2007 | Skotheim et al. | |
| 7,432,017 B2 | 10/2008 | Visco et al. | |
| 7,771,870 B2 | 8/2010 | Affinito et al. | |
| 7,785,730 B2 | 8/2010 | Affinito et al. | |
| 8,076,024 B2 | 12/2011 | Affinito et al. | |
| 8,087,309 B2 | 1/2012 | Kelley et al. | |
| 8,105,717 B2 | 1/2012 | Skotheim et al. | |
| 8,114,171 B2 | 2/2012 | Visco et al. | |
| 8,182,943 B2 | 5/2012 | Visco et al. | |
| 8,197,971 B2 | 6/2012 | Skotheim et al. | |
| 8,202,649 B2 | 6/2012 | Visco et al. | |
| 8,334,075 B2 | 12/2012 | Visco et al. | |
| 8,338,034 B2 | 12/2012 | Affinito et al. | |
| 8,383,268 B2 | 2/2013 | Inda | |
| 8,415,054 B2 | 4/2013 | Skotheim et al. | |
| 8,597,832 B2 * | 12/2013 | Deromelaere | H01M 4/136 |
| | | | 429/231.5 |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,703,343 B2 | 4/2014 | Ikeda | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont-Sempere et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,397,342 B2 | 7/2016 | Skotheim et al. | |
| 2002/0012846 A1 | 1/2002 | Skotheim et al. | |
| 2002/0192562 A1 | 12/2002 | Ferreira et al. | |
| 2005/0008938 A1 | 1/2005 | Cho et al. | |
| 2005/0095504 A1 | 5/2005 | Kim et al. | |
| 2005/0186469 A1 | 8/2005 | De Jonghe et al. | |
| 2006/0115579 A1 | 6/2006 | Mukherjee et al. | |
| 2006/0121345 A1 | 6/2006 | Yasuda et al. | |
| 2006/0147801 A1 | 7/2006 | Yasuda et al. | |
| 2006/0147802 A1 | 7/2006 | Yasuda et al. | |
| 2006/0222954 A1 | 10/2006 | Skotheim et al. | |
| 2006/0238203 A1 | 10/2006 | Kelley et al. | |
| 2007/0221265 A1 | 9/2007 | Affinito et al. | |
| 2007/0224502 A1 | 9/2007 | Affinito et al. | |
| 2008/0014501 A1 | 1/2008 | Skotheim et al. | |
| 2008/0057397 A1 | 3/2008 | Skotheim et al. | |
| 2008/0187663 A1 | 8/2008 | Affinito | |
| 2008/0213672 A1 | 9/2008 | Skotheim et al. | |
| 2008/0318128 A1 | 12/2008 | Simoneau et al. | |
| 2009/0035646 A1 | 2/2009 | Mikhaylik et al. | |
| 2009/0071835 A1 | 3/2009 | De Jonghe et al. | |
| 2009/0136830 A1 * | 5/2009 | Gordon | H01M 10/052 |
| | | | 429/50 |
| 2009/0200986 A1 | 8/2009 | Kopera | |
| 2009/0291353 A1 | 11/2009 | Affinito et al. | |
| 2010/0035128 A1 | 2/2010 | Scordilis-Kelley et al. | |
| 2010/0129699 A1 | 5/2010 | Mikhaylik et al. | |
| 2010/0239914 A1 | 9/2010 | Mikhaylik et al. | |
| 2010/0291442 A1 | 11/2010 | Wang et al. | |
| 2010/0327811 A1 | 12/2010 | Affinito et al. | |
| 2011/0006738 A1 | 1/2011 | Mikhaylik et al. | |
| 2011/0008531 A1 | 1/2011 | Mikahylik et al. | |
| 2011/0059361 A1 | 3/2011 | Wilkening et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0177398 A1 | 7/2011 | Affinito et al. | |
| 2011/0206992 A1 | 8/2011 | Campbell et al. | |
| 2012/0043940 A1 | 2/2012 | Affinito et al. | |
| 2012/0048729 A1 | 3/2012 | Mikhaylik et al. | |
| 2012/0052397 A1 | 3/2012 | Mikhaylik et al. | |
| 2012/0070746 A1 | 3/2012 | Mikhaylik et al. | |
| 2012/0088029 A1 | 4/2012 | Seo et al. | |
| 2012/0219842 A1 | 8/2012 | Visco et al. | |
| 2012/0270112 A1 | 10/2012 | Visco et al. | |
| 2012/0276449 A1 | 11/2012 | Skotheim et al. | |
| 2012/0276459 A1 * | 11/2012 | Im | H01M 10/0566 |
| | | | 429/405 |
| 2013/0017441 A1 | 1/2013 | Affinito et al. | |
| 2013/0095380 A1 | 4/2013 | Affinito et al. | |
| 2013/0143096 A1 | 6/2013 | Affinito et al. | |
| 2013/0216915 A1 | 8/2013 | Affinito et al. | |
| 2013/0224601 A1 | 8/2013 | Burnside et al. | |
| 2013/0252103 A1 | 9/2013 | Mikhaylik et al. | |
| 2013/0280605 A1 | 10/2013 | Affinito et al. | |
| 2013/0280611 A1 * | 10/2013 | Alkordi | H01M 2/1673 |
| | | | 429/224 |
| 2014/0045075 A1 | 2/2014 | Skotheim et al. | |
| 2014/0062411 A1 | 3/2014 | Mikhaylik et al. | |
| 2014/0065513 A1 * | 3/2014 | Badding | C25B 13/04 |
| | | | 429/492 |
| 2014/0072873 A1 | 3/2014 | Wang et al. | |
| 2014/0079994 A1 | 3/2014 | Affinito et al. | |
| 2014/0123477 A1 | 5/2014 | Safont Sempere et al. | |
| 2014/0127419 A1 | 5/2014 | Fleischmann et al. | |
| 2014/0127577 A1 | 5/2014 | Fleischmann et al. | |
| 2014/0193723 A1 | 7/2014 | Kumaresan et al. | |
| 2014/0205912 A1 | 7/2014 | Skotheim et al. | |
| 2014/0220439 A1 | 8/2014 | Badding et al. | |
| 2014/0272565 A1 | 9/2014 | Gronwald et al. | |
| 2014/0272594 A1 | 9/2014 | Safont Sempere et al. | |
| 2014/0272597 A1 | 9/2014 | Mikhaylik et al. | |
| 2015/0010804 A1 | 1/2015 | Laramie et al. | |
| 2015/0017510 A1 * | 1/2015 | Terado | H01M 2/145 |
| | | | 429/144 |
| 2015/0044517 A1 | 2/2015 | Mikhaylik et al. | |
| 2015/0086837 A1 | 3/2015 | Laramie et al. | |
| 2015/0162586 A1 | 6/2015 | Fleischmann et al. | |

(56) References Cited

U.S. PATENT DOCUMENTS

| | | |
|---|---|---|
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |
| 2016/0118638 A1 | 4/2016 | Gronwald et al. |
| 2016/0118651 A1* | 4/2016 | Kovalev ............... H01M 4/382 429/213 |
| 2018/0145297 A1* | 5/2018 | Choi ....................... B32B 27/08 |

FOREIGN PATENT DOCUMENTS

| | | | |
|---|---|---|---|
| CN | 104091910 A | 10/2014 | |
| JP | 08-148163 A | 6/1996 | |
| JP | 2007-018861 * | 1/2007 | ............ H01M 10/05 |
| JP | 2007-018861 A | 1/2007 | |
| JP | 2010-250968 A | 11/2010 | |
| KR | 2014-0005394 A | 1/2014 | |
| KR | 20140005394 A * | 1/2014 | ............... H01B 1/08 |
| WO | WO 1999/033125 A1 | 7/1999 | |
| WO | WO 1999/033130 A1 | 7/1999 | |
| WO | WO 2014/035753 A1 | 3/2014 | |
| WO | WO 2015/110333 A1 * | 7/2015 | ............... H01M 2/16 |

OTHER PUBLICATIONS

Knauth, Inorganic solid Li ion conductors: An overview. Solid State Ionics. Jun. 25, 2009;180:911-6.
Extended European Search Report for EP 15190730.0 dated Mar. 2, 2016.
International Search Report and Written Opinion for PCT/US2015/056563 dated Feb. 29, 2016.
Alamgir et al., Lithium Batteries, New Materials, Developments and Perspectives, Chapter 3. Elsevier, Amsterdam. 1994; 93-136.
Bron et al., $Li_{10}SnP_2S_{12}$: an affordable lithium superionic conductor. J Am Chem Soc. Oct. 23, 2013;135(42):15694-7. doi: 10.1021/ja407393y. Epub Oct. 9, 2013.
Dominey, Lithium Batteries, New Materials, Developments and Perspectives, Chapter 4. Elsevier, Amsterdam. 1994; 137-165.
Nuyken and Pask, Ring-opening polymerization—an introductory review. Polymers. 2013; 5:361-403.
Ong et al., Phase stability, electrochemical stability and ionic conductivity of the $Li10_{\pm 1}MP_2X_{12}$ (M=Ge, Si, Sn, Al or P, and X = O, S or Se) family of superionic conductors. Energy Environ Sci. 2013;6:148-56.

* cited by examiner

ION-CONDUCTIVE COMPOSITE FOR ELECTROCHEMICAL CELLS

RELATED APPLICATIONS

This application claims priority under 35 U.S.C. § 119(e) to U.S. Provisional Patent Application Ser. No. 62/067,598, filed Oct. 23, 2014, and entitled "Ion-Conductive Composite for Electrochemical Cells," which is incorporated herein by reference in its entirety for all purposes.

FIELD

Articles and methods including composite layers for protection of electrodes in electrochemical cells are provided.

BACKGROUND

One of the factors that decreases cycle life in lithium- (or other alkali metal- or alkali earth metal-) based batteries is the consumption of electrolyte during cycling of the battery due to reaction of metallic lithium present in the electrodes with the electrolyte. In order to minimize, or substantially prevent, this reaction and consequently increase the cycle life of the cell, it is desirable to isolate the metallic lithium from the electrolyte. This often times involves the use of a lithium ion conductive material layer coated on the surface of the metallic lithium. This material allows lithium ions to diffuse to and from the metallic lithium surface while excluding the electrolyte to substantially prevent this reaction. Although certain protective structures have been fabricated, improvements in the protective structures for lithium and other alkali metal electrodes would be beneficial and would have application in a number of different fields involving the use of such batteries and electrodes.

SUMMARY

Articles and methods including composite layers for protection of electrodes in electrochemical cells, are provided. The subject matter of the present invention involves, in some cases, interrelated products, alternative solutions to a particular problem, and/or a plurality of different uses of one or more systems and/or articles.

In one set of embodiments, a series of electrodes for use in an electrochemical cell is provided. In one embodiment, an electrode comprises an electroactive layer comprising an electroactive material, and a composite layer adjacent the electroactive layer. The composite layer comprises a polymeric material and a plurality of particles embedded within the polymeric material, wherein the plurality of particles have a largest cross-sectional dimension greater than an average thickness of the polymeric material within the composite layer. At least a portion of the plurality of particles are in direct contact with the electroactive layer. The composite layer is conductive to ions of the electroactive material.

In another embodiment, an electrode for use in an electrochemical cell comprises an electroactive layer comprising an electroactive material, and a composite layer having a first surface adjacent the electroactive layer and a second surface, the composite layer comprising a polymeric material. A plurality of particles are embedded within the polymeric material of the composite layer, wherein at least a portion of the plurality of particles is in direct contact with the electroactive layer at the first surface of the composite layer. At least a portion of the plurality of particles are exposed at the second surface of the composite layer. The composite layer is conductive to ions of the electroactive material.

In another embodiment, an electrode for use in an electrochemical cell prior to charge or discharge is provided. The electrode comprises an electroactive layer comprising an electroactive material, wherein a surface of the electroactive layer has a peak to valley roughness (Rz) of less than or equal to about 1 micron. The electrode also includes a composite layer adjacent the electroactive layer, the composite layer comprising a polymeric material and a plurality of particles embedded within the polymeric material.

In one set of embodiments, a series of methods are provided. In one embodiment, a method of fabricating an electrode comprises coating a surface of an electroactive layer comprising an electroactive material with a polymeric material, and positioning a plurality of particles onto at least a portion of a surface of the polymeric material. The method involves applying an external pressure to the plurality of particles to embed at least a portion of the plurality of particles into the polymeric material, thereby forming a composite layer. At least a portion of the plurality of particles are in direct contact with the electroactive layer. The composite layer is conductive to ions of the electroactive material.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
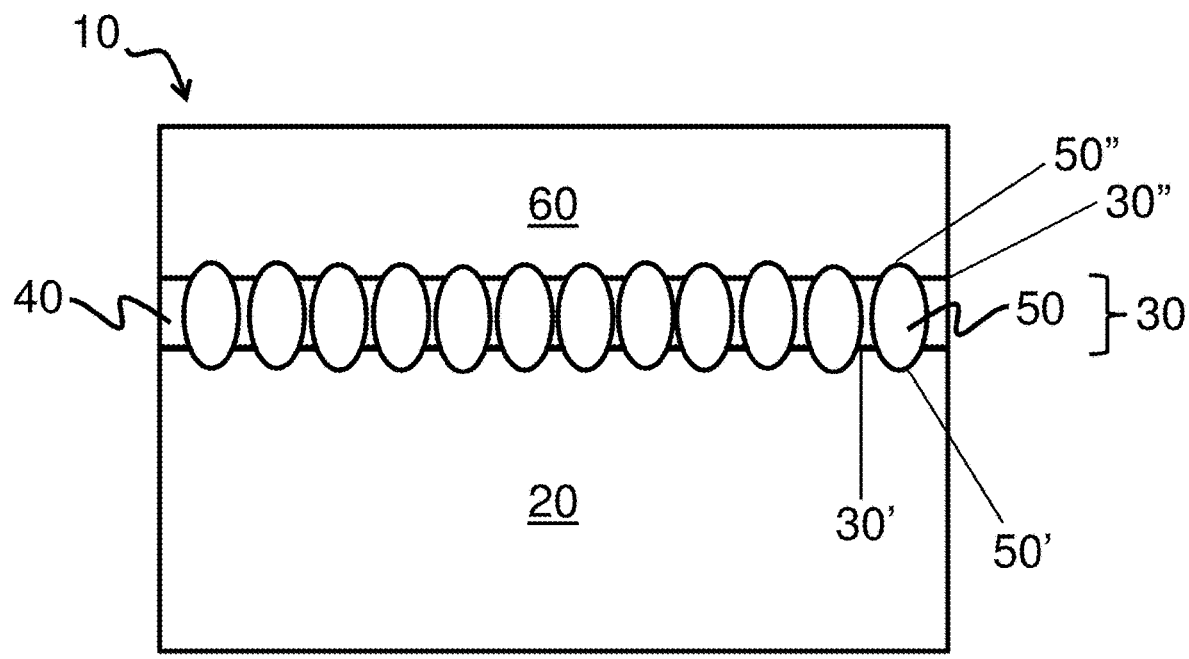
FIG. 1A is a schematic representation of a protective layer deposited on an underlying electroactive material layer, according to one set of embodiments.

Articles and methods including composite layers for protection of electrodes in electrochemical cells are provided. In some embodiments, a composite layer comprises a polymeric material (e.g., a polymer layer) and a plurality of particles embedded within the polymeric material. The disclosed composite layers may be incorporated into an electrochemical cell (e.g., a lithium-sulfur electrochemical cell) as, for example, a protective layer for an electrode and/or any other appropriate component within the electrochemical cell. In certain embodiments, electrode structures and/or methods for making electrode structures including an anode comprising lithium metal or a lithium metal alloy and a composite layer comprising a polymeric material and a plurality of particles described herein are provided.

Rechargeable lithium—sulfur (Li/S) batteries are believed to be very promising alternative power sources for long driving range (>300 km) pure electric vehicles (PEV's) and plug-in electric vehicles (PHEV) since current lithium-ion batteries (LIB) based on intercalation materials can potentially provide only energy densities up to 200 Wh kg$^{-1}$. This novel type of battery system offers much higher energy density and is relatively inexpensive. Theoretical energy density values can approach 2500 Wh kg$^{-1}$ with practical values of 500 to 600 Wh kg$^{-1}$ assuming the complete electrochemical conversion of sulfur ($S_8$) to lithium sulfide ($Li_2S$). Therefore, Li/S batteries have been investigated for mobile and portable applications, especially high energy applications.

Currently, quick capacity fading and low sulfur utilization are the main obstacles for using Li/S as rechargeable system. Only about 50% or ~800 mAhg$^{-1}$ of 1672 mAhg$^{-1}$ as theoretical capacity can be used. One reason may be the "polysulfide shuttle" mechanism. The elemental sulfur molecules accept electrons during the first discharge process and are gradually converted from higher order to lower order polysulfides. Lower polysulfides with less than three sulfur atoms ($Li_2S_3$) are insoluble in the electrolyte so that the following reduction step to the insoluble and electronically non-conductive $Li_2S_2$ is hampered. Thus low discharge efficiencies are observed at rates higher than C/10. In addition, the polysulfides are not transformed to elemental sulfur during the charging cycles. Instead of being oxidized to sulfur in the final step, the higher order polysulfides constantly diffuse to the anode where they are being gradually reduced by the elemental lithium to lower polysulfides in a parasitic reaction. The soluble lower polysulfides then diffuse back to the cathode thus establishing the "polysulfide shuttle". Insoluble lower polysulfides precipitate from the electrolyte and may accumulate on the anode side. In summary, the mechanism reduces charge efficiency and causes corrosion on anode and cathode. As result Li/S batteries suffer from capacity fading and a lack of cycle lifetime. Typical state of the art Li/S battery systems can reach lifetimes of 50-80 cycles.

The incorporation of composite layers as described herein into electrochemical cells may, for example, prevent or reduce the occurrence of chemical reactions between polysulfides (e.g., found in electrolytes comprising polysulfides) and an electroactive material of an anode (e.g., an anode comprising lithium, such as metallic lithium). The use of composite layers as described herein may offer several advantages over certain traditional protective layers, including increasing utilization of sulfur within an electrochemical cell, reduction or elimination of the shuttle affect, and/or reduction or elimination of electrolyte depletion. Composite layers (e.g., composite structures) comprising a plurality of particles, as described in more detail herein, may, in some cases, selectively conduct lithium cations but not polysulfide anions to function as a barrier (e.g., protective structure) for electrolytes (e.g., liquid electrolytes). Composite layers as described herein may offer additional advantages over certain traditional protective layers including increased flexibility, mechanical stability, chemical stability, and/or ion conductivity, e.g., between a lithium anode and an electrolyte. For example, certain existing protective layers (e.g., including certain ceramic-based ion conductive layers), such as certain protective layers in the form of thin, homogeneous films, may be very thin, brittle, easily cracked during handling or use, and/or contain defects which, as a result, do not have sufficient barrier properties to prevent electrolytes and/or polysulfides from diffusing and/or reacting with an electroactive material of an anode (e.g., an anode comprising lithium). By contrast a composite layer comprising a plurality of particles at least partially embedded within a polymeric material as described herein may have increased flexibility (e.g., as a result of the mechanical properties of the polymeric material), resulting in better barrier properties compared to certain existing protective layers in the form of thin, homogeneous films. In addition, because the particles within composite layer may have relatively high ion conductivity, the ion conductivity of the composite layers described may be comparable to those of existing protective layers.

The disclosed composite layers may be incorporated into electrochemical cells, for example, primary batteries or secondary batteries, which can be charged and discharged numerous times. In some embodiments, the materials, systems, and methods described herein can be used in association with lithium batteries (e.g., lithium-sulfur batteries). The electrochemical cells described herein may be employed in various applications, for example, making or operating cars, computers, personal digital assistants, mobile telephones, watches, camcorders, digital cameras, thermometers, calculators, laptop BIOS, communication equipment or remote car locks. It should be appreciated that while much of the description herein relates to lithium-sulfur batteries, the composite layers described herein may be applied to other lithium-based batteries, including other alkali metal-based batteries.

Turning now to the figures, the various embodiments of the current disclosure are described in more detail below. It should be understood that while certain layers depicted in the figures are disposed directly on one another, other intermediate layers may also be present between the depicted layers in certain embodiments. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present.

FIG. 1A depicts one embodiment of an electrode structure 10. The electrode structure includes an electroactive layer 20 and a composite layer 30 deposited on the electroactive layer. As described herein, composite layer 30 may be used as a protective layer to protect the electroactive layer (e.g., from reaction with an electrolyte, or species within the electrolyte). Composite layer 30 may comprise, in some cases, a polymeric material 40 (e.g., a polymer layer) and a plurality of particles 50. In some embodiments, the plurality of particles are embedded in the polymeric material. As shown in this illustrative embodiment, composite layer 30 has a first surface 30', which may be adjacent the electroactive layer. The plurality of particles may, in some cases, contact and/or be embedded in at least a portion of the electroactive layer at first surface 30'. In certain embodiments, a portion of the plurality of particles may be exposed at a first surface 30' of the composite layer (e.g., not in contact with or not embedded in polymeric material 40). For example, in some embodiments, an exposed surface 50' of the plurality of particles does not contact or is not embedded in polymeric material 40. Additionally or alternatively, in certain embodiments, a portion of the plurality of particles may be exposed at a second surface 30" of the composite layer (e.g., not in contact with or not embedded in polymeric material 40). For example, in some embodiments, an exposed surface 50" of the plurality of particles does not contact or is not embedded in polymeric material 40.

In some embodiments, the particles may be ionically conductive (e.g., substantially conductive to lithium ions) to allow transport of ions across the composite layer. Although the polymeric material of the composite layer may also be ionically conductive, in other embodiments, the polymeric material (e.g., polymer layer) is substantially non-ionically conductive (e.g., substantially non-conductive to lithium ions). Advantageously, the use of a non-ionically conductive polymeric material for the composite layer may result in decreased swelling of the polymeric material compared to an ionically-conductive polymer, e.g., in the presence of an electrolyte, which may enhance the composite layer's barrier properties.

In some embodiments, electrode structure 10 comprises one or more additional layers, although it should be appreciated that such additional layers are optional and need not be present in every embodiment. For example, in certain embodiments, electrode structure 10 comprises an electrolyte layer 60 adjacent to composite layer 30 (e.g., at second surface 30"). In some such embodiments, a portion of the particles may be in contact with and/or be embedded in the electrolyte layer. For example, in some cases, exposed surface 50" of particle 50 may be in contract with electrolyte layer 60.

In certain embodiments, electrode structure 10 comprises one or more polymer layers. For example, the polymeric material may be in the form of a single layer or a multilayer. In some cases, the multilayer structure can include two or more polymer layers wherein at least two of the polymer layers are different. In other cases, the multilayer structure can include two or more polymer layers wherein at least two, or each, of the polymer layers are the same. Other configurations are also possible.

Figure 1B:
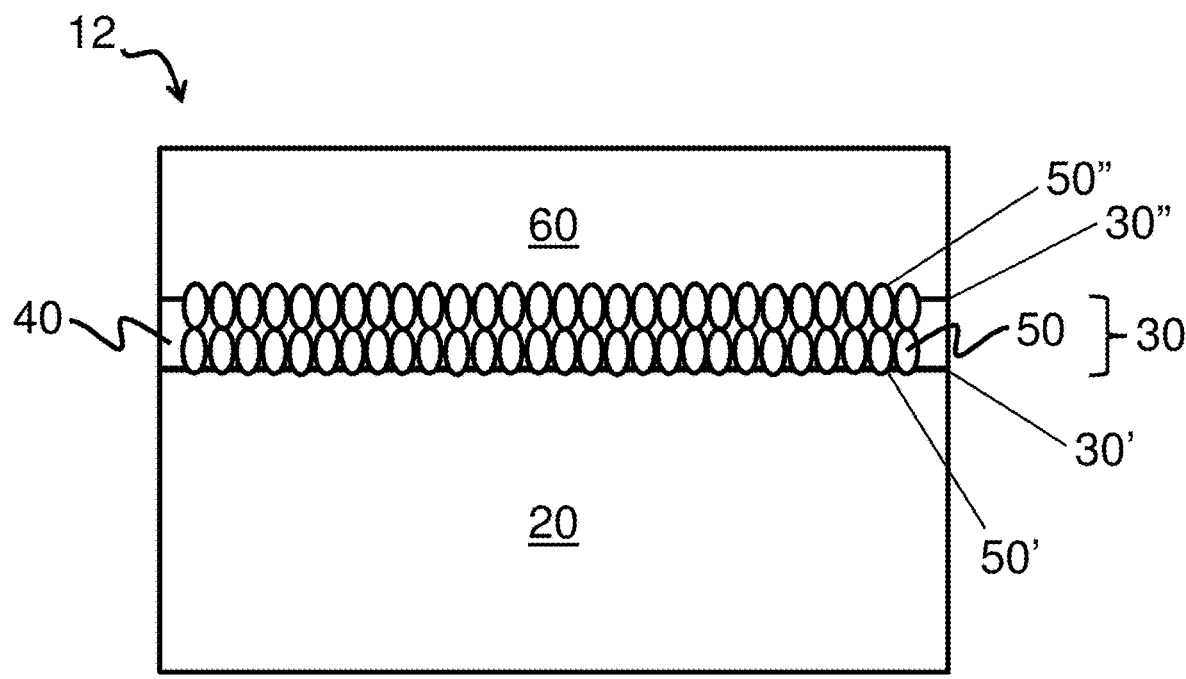
FIG. 1B is a another schematic representation of a protective layer deposited on an underlying electroactive material layer, according to one set of embodiments.

As described herein, a composite layer may comprise a plurality of particles and a polymeric material (e.g., polymer layer). In certain embodiments, the particles are at least partially embedded within the polymeric material (e.g., polymer layer). As shown illustratively in FIG. 1A, plurality of particles 50 may extend, in some cases, across the entire thickness of the composite layer. For example, in some cases, a portion of the plurality of particles may have an average largest cross-sectional dimension that is greater than an average thickness of the polymeric material (e.g., polymer layer). In certain embodiments, a portion of the plurality of particles may have an average largest cross-sectional dimension that is less than the average thickness of the polymeric material (e.g., polymer layer). For example, as illustrated in FIG. 1B, plurality of particles 50 have an average largest cross-sectional dimension (e.g., length) that is less than the average thickness of polymeric material (e.g., polymer layer) 40. That is to say, in some embodiments, at least a portion of the plurality of particles may extend across the entire average thickness of the composite layer (FIG. 1A) or only portions of the average thickness of the composite layer (FIG. 1B).

In some embodiments, particles that have an average largest cross-sectional dimension that is greater than an average thickness of the polymeric material (e.g., polymer layer) of the composite may facilitate the transfer of ions directly between the two materials on either side of the composite layer (e.g., between an electroactive material and an electrolyte material), since the particles may be in direct contact with each of these materials. In embodiments in which the particles have a largest cross-sectional dimension that is less than or equal to an average thickness of the polymer layer, the particles may be in direct contact with one another to allow ion transfer across the layers. For example, in certain embodiments, a first portion of the particles (e.g., having an average largest cross-section dimension that is less than the average thickness of the polymeric material) may contact a second portion of the particles such that there are two or more particles (e.g., two particles, three particles, four particles, five particles) in contact with one another forming an ionically conductive path across the thickness of the composite layer, e.g., between the electroactive material and a surface adjacent the composite layer (e.g., an electrolyte layer).

In some embodiments, the average largest cross-sectional dimension of the plurality of particles (e.g., within a composite layer) may be, for example, less than or equal to 100 microns, less than or equal to about 50 microns, less than or equal to about 25 microns, less than or equal to about 10 microns, less than or equal to about 5 microns, less or equal to about 2 microns, less than or equal to about 1 micron, or less than or equal to about 800 nm. In some embodiments, the average largest cross-sectional dimension of the plurality of particles may be greater than or equal to about 500 nm, greater than or equal to about 800 nm, greater than or equal to about 1 micron, greater than or equal to about 2 microns, greater than or equal to about 5 microns, greater than or equal to about 10 microns, greater than or equal to about 25 microns, or greater than or equal to about 50 microns. Combinations of the above-referenced ranges are also possible (e.g., a largest cross-sectional dimension of less than about 100 microns and greater than about 50 microns).

The average largest cross-sectional dimension of the plurality of particles may be determined, for example, by imaging the particles with a scanning electron microscope (SEM). An image may be acquired at a magnification between about 10× to about 100,000×, depending on the overall dimensions of the plurality of particles. Those skilled in the art would be capable of selecting an appropriate magnification for imaging the sample. The average largest cross-sectional dimension of the plurality of particles can be determined by taking the longest cross-sectional dimension of each particle and averaging the longest cross-sectional dimensions (e.g., averaging the longest cross-sectional dimensions for 10 particles). In certain embodiments, the plurality of particles (e.g., within a composite layer) may have an average minimum cross-sectional dimension of at least about 500 nm. For example, in some embodiments, the average minimum cross-sectional dimension of the plurality of particles may be at least about 500 nm, at least about 800 nm, at least about 1 micron, at least about 2 microns, at least about 4 microns, at least about 6 microns, or at least about 8 microns. In certain embodiments, the average minimum cross-sectional dimension of the plurality of particles may be less than or equal to about 10 microns, less than or equal to about 8 microns, less than or equal to about 6 microns, less than or equal to about 4 microns, less than or equal to about 2 microns, less than or equal to about 1 micron, or less than or equal to about 800 nm. Combinations of the above-referenced ranges are also possible (e.g., an average minimum cross-sectional dimension of less than about 2 microns and greater than about 500 nm).

In some embodiments, an aspect ratio of average largest cross-sectional dimension to average minimum cross-sectional dimension of the plurality of particles may range from, for example, 1 to 200. In certain embodiments, the aspect ratio of average largest cross-sectional dimension to average minimum cross-sectional dimension of the plurality of particles may be at least 1, at least 2, and at least 3, at least 5, at least 10, at least 15, at least 30, at least 50, at least 75, at least 100, or at least 150. In some embodiments, the aspect ratio of the average largest cross-sectional dimension to average minimum cross-sectional dimension of the plurality of particles may be less than or equal to 200, less than or equal to 150, less than or equal to 100, less than or equal to 75, less than or equal to 50, less than or equal to 30, less than or equal to 15, less than or equal to 10, less than or equal to 5 less than or equal to 3, or less than or equal to 2. Combinations of the above-reference ranges are also possible. Other aspect ratios are also possible.

In some embodiments, a portion of the plurality of particles are in direct contact with an electroactive layer. That is to say, in some cases, a portion of the plurality of particles, or a portion of a surface of each of the plurality of particles, is in contact with an electroactive layer. This configuration can allow transport of ions (e.g., metal or lithium ions) directly from the particles to the electroactive material. In some cases, at least a portion of the plurality of particles is embedded within the electroactive layer. For example, in some cases, at least about 0.1 vol % of one or more particles is embedded within the electroactive layer. In some embodiments, at least about 1 vol %, at least about 5 vol %, or at least about 10 vol %, or at least 20 vol % of one or more particles is embedded within the electroactive layer. In certain embodiments, less than or equal to about 50 vol %, less than or equal to about 30 vol %, or less than or equal to about 10 vol % of one or more particles is embedded within the electroactive layer. Combinations of the above-referenced ranges are also possible (e.g., between about 0.1 vol % and about 20 vol %). Other ranges are also possible. Methods for determining the volume percentage of particles within a layer are known within the art and may include, in some embodiments, dissecting a composite layer and imaging with, for example, a scanning electron microscope.

In some embodiments, at least some of the particles are in contact with polymeric material on at least a portion of a surface of the particles. In certain embodiments, at least some of the particles are substantially surrounded by (e.g., embedded within) a polymeric material.

In certain embodiments, portions of the particles may be exposed (e.g., not in contact with any polymeric material of the composite layer) at a first side and/or a second side of the composite layer. For example, referring again to FIG. 1A, composite layer 30 comprising plurality of particles 50 and polymeric material 40 may have first surface 30' in contact with electroactive layer 20 and second surface 30" opposite first surface 30', and not in contact with electroactive layer 20. As shown in this illustrative embodiment, exposed surfaces 50" of particles 50 are exposed at second surface 30" and at surface 50', which is in contact with and/or embedded within electroactive layer 20.

In certain embodiments, the second surface of the composite layer is in contact with an additional layer of the electrochemical cell (e.g., an optional electrolyte layer 60). In some such embodiments, at least a portion of each of the plurality of particles comprises a portion exposed at the second surface of the composite layer. In certain embodiments, at least a portion of each of the plurality of particles comprise a portion in contact with a layer opposite the electroactive layer (e.g., an electrolyte layer). In some embodiments, at least some of the plurality of particles comprises, for each particle, a first portion in direct contact with the electroactive layer at the first surface of the composite layer, and a second portion exposed at the second surface of the composite layer. The second portion of a particle may be in direct contact with an electrolyte material (e.g., an electrolyte layer).

In embodiments in which a portion of the particles are exposed or in contact with an additional material (e.g., an electrolyte) at a surface (e.g., a first and/or second surface) of the composite layer, any suitable amount of volume of the particles may be exposed. In some cases, at least about 0.1 vol % of one or more particles may be exposed at a surface (e.g., a first and/or second surface) of the composite layer. In some embodiments, at least about 1 vol %, at least about 5 vol %, or at least about 10 vol %, or at least 20 vol % of one or more particles is exposed or in contact with an additional material (e.g., an electrolyte) at a surface (e.g., a first and/or second surface) of the composite layer. In certain embodiments, less than or equal to about 50 vol %, less than or equal to about 30 vol %, or less than or equal to about 10 vol % of one or more particles is exposed or in contact with an additional material (e.g., an electrolyte) at a surface (e.g., a first and/or second surface) of the composite layer. Combinations of the above-referenced ranges are also possible (e.g., between about 0.1 vol % and about 20 vol %). Other ranges are also possible. Methods for determining the volume percentage of particles within a layer are known within the art and may include, in some embodiments, dissecting a composite layer and imaging with, for example, a scanning electron microscope or a scanning tunnel microscope.

The particles within a composite layer may have any suitable configuration within the layer. In certain embodiments, at least a portion of the plurality of particles may be organized within the composite layer. For example, at least a portion (e.g., at least 10%, at least 30%, at least 50%, and 70%) of the particles may be substantially aligned (e.g., axes formed along the lengths of the longest cross-sectional dimensions do not differ between two or more particles by greater than about 10%). In some embodiments, a portion of the plurality of particles are aligned substantially orthogonally to a surface of an electroactive layer adjacent the composite layer. In certain embodiments, at least a portion (e.g., at least 10%, at least 30%, at least 50%, and 70%) of the plurality of particles may be substantially disorganized within the composite layer. Methods for determining the alignment of particles within a layer are known within the art and may include, in some embodiments, dissecting a composite layer and imaging with a scanning electron microscope. Additionally, as described herein, one or more particles may be in direct contact with one or more additional particles within the composite layer. In some embodiments, substantially all of the particles are in direct contact with at least one other particle in the composite layer. The configuration and/or arrangement of the particles may be selected, in some cases, to allow the composite layer to serve as a protective layer to an electrolyte and/or a species within the electrolyte (e.g., a polysulfide species) by impeding such materials from permeating the composite layer while permitting the transfer of desired ions (e.g., lithium ions).

The particles of a composite layer described herein can be formed of a variety of types of materials. In certain embodiments, the material from which the particles is formed may be selected to allow ions (e.g., electrochemically active ions, such as lithium ions) to pass through the material but to substantially impede electrons from passing across the material. By "substantially impedes", in this context, it is meant that in this embodiment the material allows lithium ion flux at least ten times greater than electron passage. The particles may comprise, for example, an ion-conductive material (e.g., to facilitate the transfer of ions between materials on either side of the composite layer. Advantageously, such particles may be capable of conducting specific cations (e.g., lithium cations) while not conducting certain anions (e.g., polysulfide anions) and/or may be capable of acting as a barrier to an electrolyte and/or a polysulfide species for the electroactive layer.

In some embodiments, the particles comprise and/or are formed of an inorganic material. In certain embodiments, the inorganic material comprises a ceramic material (e.g., glasses, glassy-ceramic materials). Non-limiting examples of suitable ceramic materials include oxides (e.g., aluminium oxide, silicon oxide, lithium oxide), nitrides, and/or oxynitrides of aluminum, silicon, zinc, tin, vanadium, zirconium, magnesium, indium, and alloys thereof, $Li_{10}MP_2S_{12}$ (e.g., where M=Sn, Ge, Si), garnets, crystalline or glass sulfides, phosphates, perovskites, anti-perovskites, other ion conductive inorganic materials and mixtures thereof.

In some embodiments, the particles of a composite layer may comprise a material including one or more of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, oxy-sulfides (e.g., lithium oxy-sulfides) and combinations thereof. In some embodiments, the plurality of particles may comprise $Al_2O_3$, $ZrO_2$, $SiO_2$, $CeO_2$, and/or $Al_2TiO_5$. The selection of the material (e.g., ceramic) will be dependent on a number of factors including, but not limited to, the properties of electrolyte and the anode and cathode used in the cell.

In some embodiments, the particles of a composite layer may be selected to have a desirable ion conductivity. For example, in certain embodiments, the particles may be conductive to ions of the electroactive material (e.g. lithium). In some cases, the particles may have an average ion conductivity (e.g., lithium ion conductivity) of at least about $10^{-5}$ S/cm. In certain embodiments, the average ion conductivity (e.g., metal ion, such as lithium ion conductivity) of the particles within the composite layer is at least about $10^{-5}$ S/cm, at least about $10^{-4}$ S/cm, at least about, at least about $10^{-3}$ S/cm, at least about $10^{-2}$ S/cm, at least about $10^{-1}$ S/cm. In some embodiments, the average ion conductivity of the particles is less than about $10^{-1}$ S/cm, less than about $10^{-2}$ S/cm, less than about $10^{-3}$ S/cm, or less than about $10^{-4}$ S/cm. Combinations of the above-reference ranges are also possible (e.g., an ion conductivity between about $10^{-5}$ S/cm and about $10^{-4}$ S/cm). Other ion conductivity is are also possible. Conductivity may be measured at room temperature (e.g., 25 degrees Celsius).

In some embodiments, the average ion conductivity of the particles can be determined before the particles are incorporated into the composite layer. The average ionic conductivity can be measured by pressing the particles between two copper cylinders at a pressure of up to 3 tons/cm$^2$. In certain embodiments, the average ion conductivity (i.e., the inverse of the average resistivity) can be measured at 500 kg/cm$^2$ increments using a conductivity bridge (i.e., an impedance measuring circuit) operating at 1 kHz. In some such embodiments, the pressure is increased until changes in average ion conductivity are no longer observed in the sample.

In certain embodiments, the particles of the composite layer may have an electronic conductivity of less than about $10^{-10}$ S/cm. For example, in some embodiments, the electronic conductivity of the particles is less than or equal to about $10^{-11}$ S/cm, less than or equal to about $10^{-12}$ S/cm, less than or equal to about $10^{-13}$ S/cm, less than or equal to about $10^{-14}$ S/cm, less than or equal to about $10^{-15}$ S/cm, less than or equal to about $10^{-17}$ S/cm, or less than or equal to about $10^{-19}$ S/cm. Other values and ranges of electronic conductivity are also possible.

In certain embodiments, the particles of the composite layer are substantially non-porous. For instance, in some embodiments, the particles do not have any substantial "dead space" where undesirable species such as air can be trapped within the particles, since trapping of such species can reduce the ion conductivity of the particles. In some cases, an average porosity of the particles may be less than about 10 vol %, less than about 5 vol %, less than about 2 vol %, less than about 1 vol %, or less than about 0.1 vol %. In some embodiments, the average porosity of the particles may be between about 0.01 vol % and about 0.1 vol %, or between about 0.1 vol % and about 2 vol %.

Average porosity can be measured, for example, using a mercury porosimeter. Briefly, average porosity can be determined by measuring the external pressure required to force a liquid (e.g., mercury) into a pore (e.g., against the opposing force of surface tension between the liquid and the pore). Those skilled in the art would be capable of selecting an appropriate range of external pressures based upon the particles selected.

It may be advantageous for the particles to comprise a material that is chemically stable when in contact with one or more layers of the electrochemical cell. Generally, particles are chemically stable if the material forming the particles does not react chemically (e.g., form a byproduct) with a component of one or more materials that may come in direct contact with the particles. For example, in certain embodiments, the particles are chemically stable when in contact with the electroactive material, when in contact with the polymeric material, when in contact with an electrolyte material, and/or when in contact with a polysulfide.

As described herein, a composite layer may comprise a plurality of particles and a polymeric material (e.g., particles at least partially embedded within a polymer layer). In certain embodiments, the volume occupied by the particles in the composite layer is greater than or equal to about 1 vol % of the volume of the total composite layer. In some embodiments, the volume occupied by the particles in the composite layer is greater than or equal about 5 vol %, 15 vol %, greater than or equal about 20 vol %, greater than or equal about 30 vol %, greater than or equal to about 50 vol %, greater than or equal to about 70 vol %, greater than or equal to about 80 vol %, or greater than or equal to about 90 vol % of the total volume of the composite layer. In some embodiments, the volume occupied by the particles in the composite layer is less than about 95 vol %, less than about 90 vol %, less than about 80 vol %, less than about 70 vol %, less than about 50 vol %, less than about 30 vol %, less than about 20 vol %, or less than about 15 vol % of the total volume of the composite layer. Combinations of the above-referenced ranges are also possible (e.g., between about 10 vol % and about 95 vol %, between about 50 vol % and about 95 vol %, between about 80 vol % and about 95 vol %). Other ranges are also possible.

In some embodiments, the weight percentage of the particles in the composite layer is greater than or equal to about 5 wt % of the total composition of the composite layer. In certain embodiments, the weight percentage of the particles in the composite layer is greater than or equal to about 10 wt %, greater than or equal about 20 wt %, greater than or equal about 30 wt %, greater than or equal to about 50 wt %, greater than or equal to about 70 wt %, greater than or equal to about 80 wt %, or greater than or equal to about 90 wt % of the total composition of the composite layer. In some embodiments, the weight percentage of the particles in the composite layer is less than about 95 wt %, less than about 90 wt %, less than about 80 wt %, less than about 70 wt %, less than about 50 wt %, less than about 30 wt %, less than about 20 wt %, or less than about 10 wt % of the total composition of the composite layer. Combinations of the above-reference ranges are also possible (e.g., between about 5 wt % and about 95 wt %, between about 50 wt % and about 95 wt %, between about 80 wt % and about 95 wt %). Other ranges are also possible. Methods for determining the weight percentage of particles within a layer are known within the art and may include, in some embodiments, weighing the particles and the polymer before the formation of the composite layer.

As described herein, a composite layer may include a polymeric material. The polymeric material may be in the form of a polymer layer. The polymer layer may be substantially non-uniform; for example, the layer may include particles that are at least partially embedded within the polymer layer, making the polymeric material non-uniformly distributed within the layer.

Any suitable polymeric material can be included in a composite layer. In some embodiments, the polymeric material may consist essentially of one or more polymeric materials. The polymeric material may, in some embodiments, be a monomer, a mixture of copolymers, block copolymers, or a combination of two or more polymers that are in an interpenetrating network or semi-interpenetrating network. In alternative embodiments, the polymeric material may comprise a filler and/or solid additive. The filler and/or solid additive may add strength, flexibility, and/or improved adhesion properties to the polymer. In some embodiments, the polymer may comprise a plasticizer or other additives, including solid phase change materials. Addition of plasticizers may increase flexibility of the polymer and improve thixotropic properties. Addition of solid phase change materials may result in addition of materials that melt at elevated temperatures and thereby act as a heat sink and prevent thermal runaway.

In some embodiments, the polymeric material may be selected to be flexible. Nano-hardness studies may be conducted to measure creep and/or hardness and thereby assess the flexibility and/or brittleness of a polymeric material. In certain cases, the polymeric material may be selected to be thermally stable above 100° C., 150° C., 200° C., 250° C., 300° C., 350° C., or 400° C. Thermal stability may be assessed by differential scanning calorimetry (DSC). Non-limiting examples of polymeric materials that may exhibit thermal stability at elevated temperatures include polysiloxanes, polycyanurates, and polyisocyanurates.

The polymeric material may, in certain cases, be selected to be substantially inert to the electrolyte solution and/or to Li polysulfide attack. A means of determining the stability of a polymeric material in an electrolyte solution includes exposing a small sample of the polymeric material to vapors of an electrolyte solvent, or to the electrolyte solvent itself. Examples of polymeric materials that may be stable in an electrolyte solution include, but are not limited to, polyurethanes and polysiloxanes. Additional tests that may be conducted on polymeric materials to examine various characteristics include Fourier transform infrared spectroscopy (FTIR) to confirm that a polymeric material is cured or cross-linked, scanning electron microscopy with energy dispersive x-ray spectroscopy (SEM-EDS) to determine whether a polymeric material has cracks. Such test and other tests can also be used to determine whether a composite layer comprises discrete layers, interpenetrating networks, or semi-interpenetrating networks. Profilometry can be used to assess how rough the surface of a polymeric material is.

Other classes of polymeric materials that may be suitable for use in a composite layer include, but are not limited to, polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamides, poly(acrylates), poly (methacrylates), poly(2-vinyl pyridine), poly(N-vinylpyrolidone), poly(methylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polyethylene, polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymeric material may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known.

Accordingly, those of ordinary skill in the art can choose suitable polymeric materials based on their mechanical and/or electronic properties (e.g., ionic and/or electronic conductivity), and/or can modify such polymeric materials to be ionically conducting (e.g., conductive towards single ions) and/or electronically non-conducting based on knowledge in the art, in combination with the description herein. As described herein, in some embodiments the polymeric material is substantially non-ionically conductive. However, in other embodiments in which it is desirable for the polymeric material to be ionically conductive, the polymeric materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity. Salts may be added to the material in a range of, e.g., 0 to 50 mol %. In certain embodiments, salts are included in at least 5 mol %, at least 10 mol %, at least 20 mol %, at least 30 mol %, at least 40 mol %, or at least 50 mol % of the material. In certain embodiments, additional salts are less than or equal to 50 mol %, less than or equal to 40 mol %, less than or equal to 30 mol %, less than or equal to 20 mol %, or less than or equal to 10 mol % of the material. Combinations of the above-noted ranges are also possible. Other values of mol % are also possible.

In some embodiments, the average ionic conductivity of the polymeric material of a composite layer is at least about $10^{-8}$ S/cm, $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the polymeric material may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm. Combinations of the above-referenced ranges are also possible (e.g., an average ionic conductivity in the electrolyte of at least about $10^{-8}$ S/cm and less than or equal to about $10^{-1}$ S/cm). Conductivity may be measured at room temperature (e.g., 25 degrees Celsius).

In some embodiments, the polymeric material may be substantially non-ionically conductive and substantially non-electrically conductive. For example, non-electrically conductive materials (e.g., electrically insulating materials) such as those described herein can be used. In other embodiments, the polymeric material may be ionically conductive but substantially non-electrically conductive. Examples of such polymeric materials include non-electrically conductive materials (e.g., electrically insulating materials) that are doped with lithium salts, such as acrylate, polyethylene oxide, silicones, and polyvinyl chlorides.

In some embodiments, the polymeric material included in a composite is substantially non-swellable in an electrolyte solvent to be used in an electrochemical cell including such a composite layer. For instance, the polymeric material may experience a volume change of less than 10%, less than 8%, less than 6%, less than 4%, less than 2%, or less than 1% when in contact with an electrolyte solvent (including any salts or additives present) to be used in an electrochemical cell including such a composite layer for at least 24 hours. Simple screening tests of such polymers can be conducted by placing pieces of polymer in the electrolyte solvent (including any salts or additives present) and measuring the weight or volume change of the polymer pieces before and after a 24 hour period, and determining the percentage change in volume relative to the volume before placement in the solvent.

It may be advantageous, in some embodiments, for the polymeric material to comprise or be formed of a material that is chemically stable when in contact with one or more layers of the electrochemical cell (e.g., an electrolyte layer). The polymeric material may be chemically stable if, for example, the material does not react chemically (e.g., form a byproduct) with a component of one or more additional layers of the electrochemical cell in direct contact with the polymeric material. For example, in certain embodiments, the polymeric material is chemically stable when in contact with the electroactive material, when in contact with an electrolyte material, and/or when in contact with a polysulfide. In certain embodiments, the polymeric material may form a reaction product with the components of the electrode for electrochemical cell (e.g., an electroactive material, an electrolyte material (e.g., a species within the electrolyte), and/or a polysulfide); however, in such embodiments, the reaction product does not interfere with the function of a layer including the polymeric material (e.g., the layer remains ionically conductive).

In certain embodiments, the polymeric material may be substantially non-cross-linked. However, in other embodiments, the polymeric material is cross-linked. In some such embodiments, the polymeric material may be cross-linked with a portion of the plurality of particles. For example, in some embodiments, a portion of the plurality of particles may be coated with a cross-linking polymer (e.g., bound to the surface of a portion of the plurality of particles). Cross-linking can be achieved by, for example, adding cross-linker to a polymer and performing a cross-linking reaction, e.g., by thermal or photochemical curing, e.g. by irradiation with such as UV/vis irradiation, by γ-irradiation, electron beams (e-beams) or by heating (thermal cross-linking). Examples of cross-linkers may include ones selected from molecules with two or more carbon-carbon double bonds, e.g., ones with two or more vinyl groups. Particularly useful cross-linkers are selected from di(meth)acrylates of diols such as glycol, propylene glycol, diethylene glycol, dipropylene glycol, 1,3-propanediol, 1,4-butanediol, triethylene glycol, tetrapropylene glycol, cyclopentadiene dimer, 1,3-divinyl benzene, and 1,4-divinyl benzene. Some suitable cross-linkers may comprise two or more epoxy groups in the molecule, such as, for example, bis-phenol F, bis-phenol A, 1,4-butanediol diglycidyl ether, glycerol propoxylate triglycidyl ether, and the like.

As described above, in some embodiments, the plurality of particles of a composite layer may have a largest average cross-sectional dimension that is greater than an average thickness of the polymeric material (e.g., an average thickness of the polymeric material as measured before the incorporation of particles, as described in more detail below). In certain embodiments, the average thickness of the polymeric material (e.g., before the incorporation of particles) may be greater than an average largest cross-sectional dimension of the plurality of particles. For example, in some embodiments, the polymeric material (e.g., polymer layer) described herein may have a thickness of at least about 500 nm, at least about 1 micron, at least about 5 microns, at least about 10 microns, at least about 15 microns, at least about 20 microns, at least about 25 microns, at least about 30 microns, at least about 40 microns, at least about 50 microns, at least about 70 microns, at least about 100 microns, at least about 200 microns, at least about 500 microns, or at least about 1 mm. In some embodiments, the thickness of the polymeric material (e.g., polymer layer) is less than or equal to about 1 mm, less than or equal to about 500 microns, less than or equal to about 200 microns, less than or equal to about 100 microns, less than or equal to about 70 microns, less than or equal to about 50 microns, less than or equal to about 40 microns, less than or equal to about 30 microns, less than or equal to about 20 microns, less than or equal to about 10 microns, or less than or equal to about 5 microns. Other values are also possible. Combinations of the above-noted ranges are also possible.

The average thickness of the polymeric material can be determined by, for example, using a drop gauge or scanning electron microscopy (SEM). Briefly, the polymeric material can be imaged along a cross-section (e.g., by cutting the polymeric material) and the image may be acquired by SEM. The average thickness may be determined by taking an average of the thickness of the sample at several different locations along the cross-section (e.g., at least 5 locations). Those skilled in the art would be capable of selecting an appropriate magnification for imaging the sample.

In some embodiments, a composite layer comprising a plurality of particles and a polymer layer may have any suitable thickness. In some embodiments, a composite layer described herein may have an average thickness of at least about 500 nm, at least about 1 micron, at least about 5 microns, at least about 10 microns, at least about 15 microns, at least about 20 microns, at least about 25 microns, at least about 30 microns, at least about 40 microns, at least about 50 microns, at least about 70 microns, at least about 100 microns, at least about 200 microns, at least about 500 microns, or at least about 1 mm. In some embodiments, the average thickness of the composite layer is less than or equal to about 1 mm, less than or equal to about 500 microns, less than or equal to about 200 microns, less than or equal to about 100 microns, less than or equal to about 70 microns, less than or equal to about 50 microns, less than or equal to about 40 microns, less than or equal to about 30 microns, less than or equal to about 20 microns, less than or equal to about 10 microns, or less than or equal to about 5 microns. Other ranges are also possible. Combinations of the above-noted ranges are also possible.

The average thickness of the composite layer can be determined, for example, using a drop gauge or scanning electron microscopy (SEM), as described above.

In certain embodiments, the composite layer has an overall ionic conductivity (e.g., lithium ion conductivity) of at least about $10^{-10}$ S/cm, $10^{-9}$ S/cm, $10^{-8}$ S/cm, $10^{-7}$ S/cm, at least about $10^{-6}$ S/cm, at least about $10^{-5}$ S/cm, at least about $10^{-4}$ S/cm, at least about $10^{-2}$ S/cm, or at least about $10^{-1}$ S/cm. In certain embodiments, the average ionic conductivity of the composite layer (e.g., lithium ion conductivity) may be less than or equal to about less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, less than or equal to about $10^{-8}$ S/cm, or less than or equal to about $10^{-9}$ S/cm. Combinations of the above-referenced ranges are also possible (e.g., an average ionic conductivity of at least about $10^{-10}$ S/cm and less than or equal to about $10^{-1}$ S/cm). Conductivity (e.g., dry conductivity) may be measured at room temperature (e.g., 25 degrees Celsius), for example, using a conductivity bridge (i.e., an impedance measuring circuit) operating at 1 kHz in the absence of an electrolyte and/or solvent (i.e., for a dry composite layer).

In some embodiments, the composite layer (e.g., comprising a polymer and a plurality of particles), as described herein, may have a mean peak to valley roughness ($R_z$) of less than or equal to about 2 μm, less than or equal to about 1.5 μm, less than or equal to about 1 μm, less than or equal to about 0.9 μm, less than or equal to about 0.8 μm, less than or equal to about 0.7 μm, less than or equal to about 0.6 μm, less than or equal to about 0.5 μm, or any other appropriate roughness. In some embodiments, the composite layer has an $R_z$ of greater than or equal to about 50 nm, greater than or equal to about 0.1 μm, greater than or equal to about 0.2 μm, greater than or equal to about 0.4 μm, greater than or equal to about 0.6 μm, greater than or equal to about 0.8 μm, greater than or equal to about 1 μm, or any other appropriate roughness. Combinations of the above-noted ranges are possible (e.g., an $R_z$ of greater than or equal to about 0.1 μm and less than or equal to about 1 μm). Other ranges are also possible.

The mean peak to valley roughness (Rz) may be calculated, for example, by imaging the surface with a non-contact 3D optical microscope (e.g., an optical profiler). Briefly, an image may be acquired at a magnification between about 5× and about 110× (e.g., an area of between about 50 microns×50 microns and about 1.2 mm×1.2 mm) depending on the overall surface roughness. Those skilled in the art would be capable of selecting an appropriate magnification for imaging the sample. The mean peak to valley roughness can be determined by taking an average of the height difference between the highest peaks and the lowest valleys for a given sample size (e.g., averaging the height difference between the five highest peaks and the five lowest valleys across the imaged area of the sample) at several different locations on the sample (e.g., images acquired at five different areas on the sample).

In embodiments wherein the composite layer includes a polymer layer comprising a polymeric material that is non-ionically conductive and a plurality of ionically conductive particles, the ionic conductivity of the composite layer may be largely determined by the ionic conductivity of the particles. For example, the average ionic conductivity of the composite layer may be equal to, or less than that of, the ionic conductivity of the plurality of particles.

In certain embodiments, a composite structure described herein may comprise two or more layers (e.g., comprising two or more polymer layers that include a plurality of particles). For example, in some embodiments, the composite structure may comprise a first polymer layer comprising a first polymeric material and a second polymer layer adjacent the first polymer layer comprising a second polymeric material. At least one of the first and second polymer layers (e.g., comprising a first polymeric material and a second polymeric material) may comprise a plurality of particles, e.g., at least partially embedded within the layer(s). Is some embodiments, both first and second polymer layers (e.g., polymeric materials) include a plurality of particles, e.g., at least partially embedded within the layer(s). In certain embodiments, the first polymeric material and a second polymeric material are different (e.g., include different types of polymeric materials, different amounts of cross-linking). In other embodiments, the first and second polymeric materials are the same, but may have different amounts or types of components (e.g., particles) therein. In some embodiments, one or more layers of the composite structure may comprise particles formed of a first material and particles formed of a second material, wherein the first and second materials are different. In some embodiments, the plurality of particles may comprise a mixture of two or more materials.

As described herein, it may be desirable to determine if a composite layer (e.g., comprising a plurality of particles and a polymeric material) has advantageous properties as compared to other materials used as a protective layer (e.g., a protective layer formed of a polymeric material alone, a protective layer formed of an ion-conductive material alone, or combinations thereof) for particular electrochemical systems. Therefore, simple screening tests can be employed to help select between candidate materials. One simple screening test includes positioning a composite layer (e.g., comprising a polymer layer and a plurality of particles) in an electrochemical cell, e.g., as a protective layer in a cell. The electrochemical cell may then undergo multiple discharge/charge cycles, and the electrochemical cell may be observed for whether inhibitory or other destructive behavior occurs compared to that in a control system. If inhibitory or other destructive behavior is observed during cycling of the cell, as compared to the control system, it may be indicative of hydrolysis, or other possible degradation mechanisms of the composite layer, within the assembled electrochemical cell. Using the same electrochemical cell it is also possible to evaluate the electrical conductivity and ion conductivity of the composite layer using methods known to one of ordinary skill in the art. The measured values may be compared to select between candidate materials and may be used for comparison with baseline material(s) in the control.

In some embodiments, it may be desirable to test the composite layer for swelling in the presence of a particular electrolyte or solvent to be used in an electrochemical cell (including any salts or additives present). A simple screening test may involve, for example, pieces of the composite layer that are weighed and then placed in a solvent or an electrolyte to be used in an electrochemical cell for any suitable amount of time (e.g., 24 hours). The percent difference in weight (or volume) of the composite layer before and after the addition of a solvent or an electrolyte may determine the amount of swelling of the composite layer in the presence of the electrolyte or the solvent.

Another simple screen test involves determining the stability (i.e., integrity) of a composite layer to polysulfides. Briefly, the composite layer may be exposed to a polysulfide solution/mixture for any suitable amount of time (e.g., 72 hours) and the percent weight loss of the composite layer after exposure to the polysulfide solution may be determined by calculating the difference in weight of the composite layer before and after the exposure. For example, in some embodiments, the percent weight loss of the composite layer after exposure to the polysulfide solution may be less than or equal to about 15 wt %, less than or equal to about 10 wt %, less than or equal to about 5 wt %, less than or equal to about 2 wt %, less than or equal to about 1 wt %, or less than or equal to about 0.5 wt %. In certain embodiments, the percent weight loss of the composite layer after exposure to the polysulfide solution may be greater than about 0.1 wt %, greater than about 0.5 wt %, greater than about 1 wt %, greater than about 2 wt %, greater than about 5 wt %, or greater than about 10 wt %. Combinations of the above-referenced ranges are also possible (e.g., between about 0.1 wt % and about 5 wt %).

The above described screening tests may also be adapted and used to determine the properties of individual components of the composite layer (e.g. polymeric material/polymer layer and/or a plurality of particles).

Methods for forming a composite layer comprising a polymeric material (e.g., a polymer layer) and a plurality of particles are now provided. In some embodiments, a method may involve forming a composite layer adjacent to or on a portion of an electroactive material (e.g., an anode comprising lithium, a cathode comprising sulfur) or other suitable substrate.

Figure 2A:
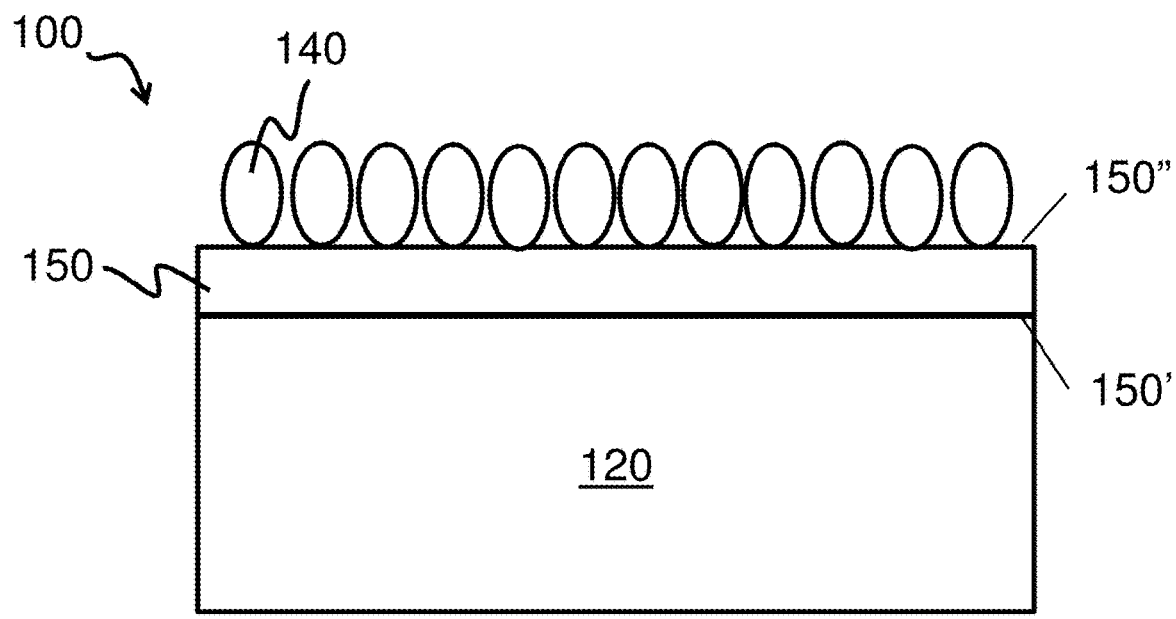
FIGS. 2A-B are a schematic representation of a method for manufacturing an electrode structure, according to one set of embodiments.
Figure 2B:
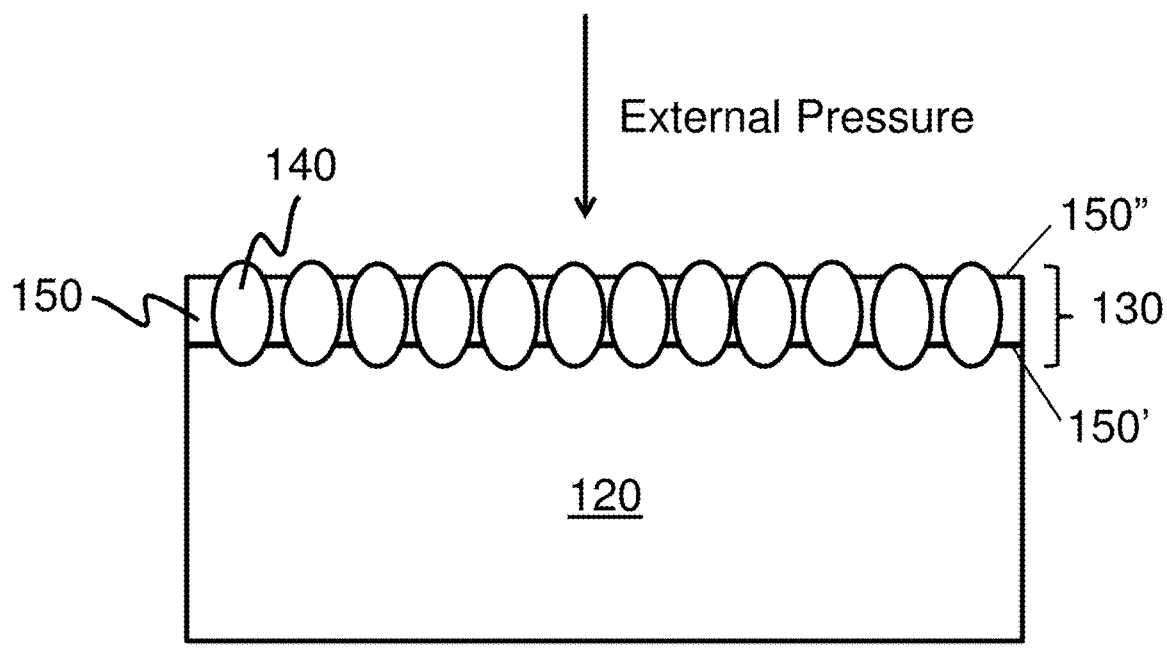

In one exemplary method, and referring to FIG. 2A, a forming a composite may involve providing an electroactive layer 120 as a substrate for the formation of the composite layer. The electroactive layer may be coated with a polymeric material 150 in the form of a polymer layer. Particles 140 may be positioned on a surface 150" of the polymeric material in any suitable configuration, as described herein. Referring now to FIG. 2B, an external pressure (as indicated by the arrow) may be applied, in some cases, to the particles positioned on the surface of the polymer layer. The application of an external pressure (e.g., normal to the surface of the electroactive layer) may cause the particles to be at least partially embedded within the polymer layer. In certain embodiments, sufficient external pressure (e.g., normal to the surface of the electroactive layer) is applied to the particles such that the particles come into direct contact with the electroactive layer. In some embodiments, applying the external pressure (e.g., normal to the surface of the electroactive layer) causes the particles to be at least partially embedded within the electroactive layer (FIG. 2B).

Methods of applying external pressure will be known to those skilled in the art. For example, the method of applying external pressure may involve arranging the components (e.g., the electroactive layer, the polymer layer, and/or the particles) between two stainless steel plates and compressing the plates (e.g., using a pressure/force normal to the surface of the electroactive layer) with a hydraulic press.

The applied external pressure (e.g., normal to the surface of the electroactive layer) may be greater than or equal to about 5 $kg/cm^2$, greater than or equal to about 10 $kg/cm^2$, greater than or equal to about 20 $kg/cm^2$, greater than or equal to about 35 $kg/cm^2$, greater than or equal to about 50 $kg/cm^2$, greater than or equal to about 75 $kg/cm^2$, greater than or equal to about 90 $kg/cm^2$, or greater than or equal to about 100 $kg/cm^2$. In certain embodiments, the applied external pressure may be less than about 150 $kg/cm^2$, less than about 100 $kg/cm^2$, less than about 90 $kg/cm^2$, less than about 75 $kg/cm^2$, less than about 50 $kg/cm^2$, less than about 35 $kg/cm^2$, less than about 20 $kg/cm^2$, or less than about 10 $kg/cm^2$. Combinations of the above-referenced ranges are also possible (e.g., between about 10 $kg/cm^2$ and about 50 $kg/cm^2$, between about 20 $kg/cm^2$ and about 35 $kg/cm^2$, between about 50 $kg/cm^2$ and about 100 $kg/cm^2$, between about 100 $kg/cm^2$ and about 150 $kg/cm^2$). Other values of external pressure are also possible.

In some embodiments comprising forming the composite layer, the polymeric material may have desirable flow properties at room temperature (e.g., at about 25° C.). For example, some such embodiments, the polymeric material may be capable of viscous flow at a temperature. In some embodiments, the method further comprises curing the polymeric material. In certain embodiments, curing the polymeric material comprises exposing the polymeric material to ultraviolet light. Additionally or alternatively, curing the polymeric material may comprise exposing the polymeric material to a temperature of at least about 50° C., of at least about 60° C., of at least about 70° C., of at least about 90° C., of at least about 100° C., or at least about 120° C. Curing the polymeric material may, in some embodiments, cross-link the polymeric material and/or a portion of the plurality of particles (e.g., comprising a cross-linkable material attached to the surface of a portion of the plurality of particles).

While many embodiments described herein relate to lithium/sulfur electrochemical cells, it is to be understood that any analogous alkali metal/sulfur electrochemical cells (including alkali metal anodes) can be used. As noted above and as described in more detail herein, in some embodiments, the composite layer is incorporated into a lithium-sulfur electrochemical cell as a protective layer for an electrode. In some embodiments, the composite layers disclosed herein may included in an electrochemical cell comprising at least one electrode structure. In some cases, the electrochemical cell may be fabricated by providing an electrode structure, one or more the composite layers, and an electrolyte layer. The electrode structures may include an electroactive layer (e.g., an anode or a cathode) and one or more composite layers. The composite layers may be highly conductive to electroactive material ions and may protect the underlying electroactive material surface from reaction with components in the electrolyte, as described above. In some embodiments, the composite layer may be adjacent the anode. In some embodiments, the composite layer may be adjacent the cathode.

An electrochemical cell or an article for use in an electrochemical cell may include a cathode electroactive material layer. Suitable electroactive materials for use as cathode active materials in the cathode of the electrochemical cells described herein may include, but are not limited to, electroactive transition metal chalcogenides, electroactive conductive polymers, sulfur, carbon, and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In certain embodiments, the sulfur-containing material (e.g., in an oxidized form) comprises a polysulfide moiety, Sm, selected from the group consisting of covalent Sm moieties, ionic Sm moieties, and ionic $S_m^{2-}$ moieties, wherein m is an integer equal to or greater than 3. In some embodiments, m of the polysulfide moiety Sm of the sulfur-containing polymer is an integer equal to or greater than 6 or an integer equal to or greater than 8. In some cases, the sulfur-containing material may be a sulfur-containing polymer. In some embodiments, the sulfur-containing polymer has a polymer backbone chain and the polysulfide moiety Sm is covalently bonded by one or both of its terminal sulfur atoms as a side group to the polymer backbone chain. In certain embodiments, the sulfur-containing polymer has a polymer backbone chain and the polysulfide moiety Sm is incorporated into the polymer backbone chain by covalent bonding of the terminal sulfur atoms of the polysulfide moiety.

In some embodiments, the electroactive sulfur-containing material comprises more than 50% by weight of sulfur. In certain embodiments, the electroactive sulfur-containing material comprises more than 75% by weight of sulfur (e.g., more than 90% by weight of sulfur).

As will be known by those skilled in the art, the nature of the electroactive sulfur-containing materials described herein may vary widely. In some embodiments, the electroactive sulfur-containing material comprises elemental sulfur. In certain embodiments, the electroactive sulfur-containing material comprises a mixture of elemental sulfur and a sulfur-containing polymer.

In certain embodiments, an electrochemical cell as described herein, comprises one or more cathodes comprising sulfur as a cathode active species. In some such embodiments, the cathode includes elemental sulfur as a cathode active species.

Suitable electroactive materials for use as anode active materials in the electrochemical cells described herein include, but are not limited to, lithium metal such as lithium foil and lithium deposited onto a conductive substrate, and lithium alloys (e.g., lithium-aluminum alloys and lithium-tin alloys). Lithium can be contained as one film or as several films, optionally separated by a protective material such as a ceramic material or an ion conductive material described herein. Suitable ceramic materials include silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the embodiments described herein can include alloys of lithium and aluminum, magnesium, silicium (silicon), indium, and/or tin. While these materials may be preferred in some embodiments, other cell chemistries are also contemplated. In some embodiments, the anode may comprise one or more binder materials (e.g., polymers, etc.).

One or more electroactive layers (e.g., comprising an electroactive material), as described herein, may have a mean peak to valley roughness ($R_z$) of less than or equal to about 2 μm, less than or equal to about 1.5 μm, less than or equal to about 1 μm, less than or equal to about 0.9 μm, less than or equal to about 0.8 μm, less than or equal to about 0.7 μm, less than or equal to about 0.6 μm, less than or equal to about 0.5 μm, or any other appropriate roughness. In some embodiments, the one or more electroactive layers (e.g., comprising an electroactive material) has an $R_z$, of greater than or equal to about 50 nm, greater than or equal to about 0.1 μm, greater than or equal to about 0.2 μm, greater than or equal to about 0.4 μm, greater than or equal to about 0.6 μm, greater than or equal to about 0.8 μm, greater than or equal to about 1 μm, or any other appropriate roughness. Combinations of the above-noted ranges are possible (e.g., an $R_z$ of greater than or equal to about 0.1 μm and less than or equal to about 1 μm). Other ranges are also possible. In some embodiments, the mean peak to valley roughness of one or more electroactive layers is determined prior to charge/discharge of the electrochemical cell. The mean peak to valley roughness ($R_z$) of the one or more electroactive layers may be determined, for example, by imaging the surface with a non-contact 3D optical microscope (e.g., an optical profiler), as described above.

In certain embodiments, the electrochemical cell comprises an electrolyte. The electrolytes used in electrochemical or battery cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, an electrolyte is in the form of a layer having a particular thickness. An electrolyte layer may have a thickness of, for example, at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity) as described herein. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may range, in some cases, from about 5 wt %:95 wt % to 95 wt %:5 wt %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some embodiments, the non-aqueous electrolyte comprises at least one lithium salt. For example, in some cases, the at least one lithium salt is selected from the group consisting of $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(C_nF_{2n+1}SO_2)_3$, wherein n is an integer in the range of from 1 to 20, and $(C_nF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, an electrode structure described herein comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. In certain embodiments, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some embodiments a current collector separate from the electroactive layer may not be needed.

The following examples are intended to illustrate certain embodiments of the present invention, but do not exemplify the full scope of the invention.

Example 1

This example describes a general fabrication scheme for composite layers including a polymeric material and a plurality of particles that was used to form the composite layer in Examples 2 and 3. The composite layers can be used to protect an electrode from a liquid electrolyte, or species within the electrolyte.

First, a layer of Li foil or vacuum deposited lithium (VDL) was coated with a solution of soft polymer (e.g., polybutadiene, polyisoprene or their co-polymers) containing a cross-linking compound and optionally an initiator.

The polymers used were non-ionically conductive. The polymer layer was either a single layer or had a multilayer structure. A single layer of Li conductive ceramic particles was applied onto surface of the polymer. The ceramic particles had an average largest cross-sectional dimension of at least twice than the starting thickness of the polymer layer. Pressure (greater than 10 kg/cm$^2$) was applied to the particles in a direction orthogonal to the surface of the polymer layer by placing the particles and polymer layer between two stainless steel plates and compressing with a hydraulic press. The pressure caused the ceramic particles to be embedded into the polymer layer, and to penetrate into portions of the Li metal layer so that the particles made direct physical contact with the lithium metal. At the same time, at least some of the ceramic particles were surrounded/embedded with polymeric material on the sides. The polymer layer was then subjected to heat treatment to cross-link the polymeric material, making it insoluble and non-swellable in the electrolyte.

At least a portion of the particles were exposed on the side of the composite layer opposing the lithium metal layer such that the particles were in direct contact with an electrolyte. This configuration of the composite layer allowed conducting Li ions to be transported from/to the electrolyte to/from the lithium metal layer without allowing the direct contact of electrolyte solvents with the Li metal during the discharge/charge process.

Different types of ion conductive ceramic materials with sufficient ionic conductivity can be used. Anodes prepared as described above are useful in Li—S cells or in other electrochemical systems as Li-metal oxide (metallic lithium Li-ion cathode) with or without separator. It also can be used in Li-ion batteries as an anode protective layer.

Example 2

This example describes the fabrication of a composite layer, as outlined in Example 1.

Figure 3A:
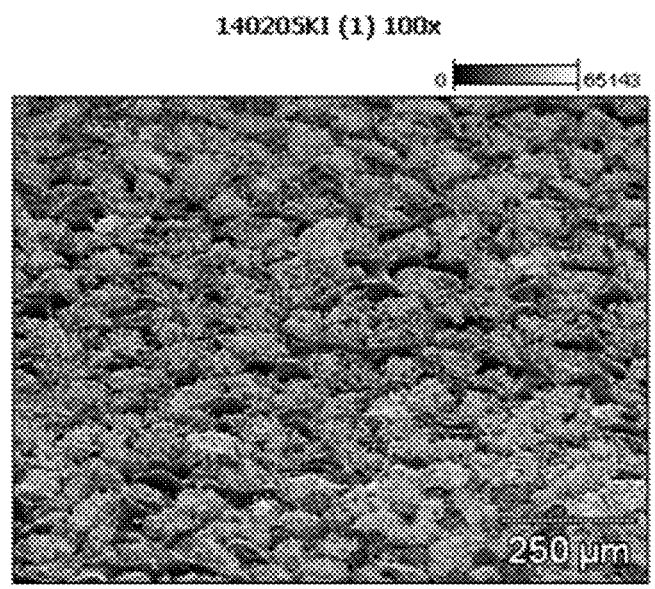
FIG. 3A shows a tiled view SEM image of a protective layer, according to one set of embodiments.
Figure 3B:
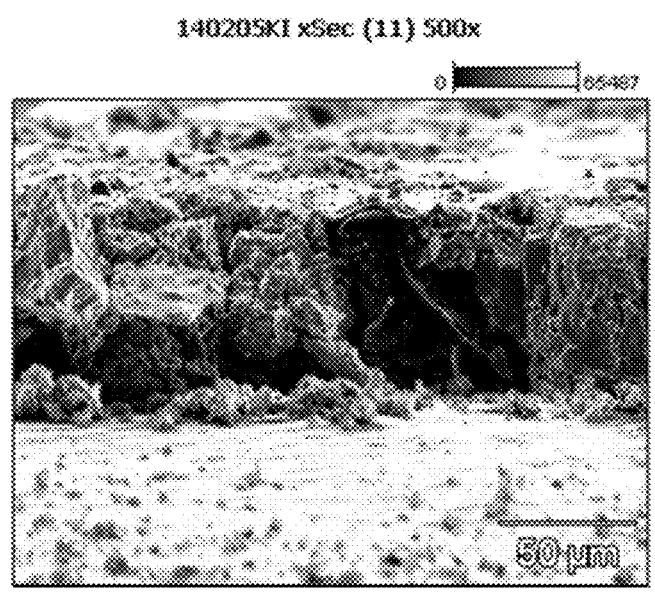
FIG. 3B shows a cross-sectional view SEM image of a protective layer, according to one set of embodiments.

A 5 wt % solution of polyisobutene (Oppanol B150, BASF product) in toluene was coated onto a VDL layer with a doctor blade technique and dried at room temperature for 3 h. The thickness of the polymer coating was 10 μm. $Li_{10}SnP_2S_{12}$ ceramic powder (ranging in particle size between 39-75 microns) was dispersed onto the polymer layer until a monolayer of the ceramic powder was formed on the polymer layer. An external pressure of 35 kg/cm$^2$ was applied to the sample for 1 minute. SEM analysis showed that ceramic particles penetrated through polymer layer into Li metal (FIGS. 3A-B). The resulting composite layer was flexible and no cracks were observed (e.g., using SEM) if bent. Impedance measurement showed an ionic conductivity of $6.4*10^{-8}$ S/cm.

Example 3

This example describes the fabrication of a composite layer, as outlined in Example 1.

A toluene solution containing polybutadiene (5 wt %), trimethylolpropane mercaptopropyonate (3 wt % to polymer) and photoinitiator (Lucirin TPO-L, BASF product, 1 wt % to polymer) was coated onto a VDL layer using a doctor blade technique and dried at room temperature for 3 h. The thickness of polymer coating was 10 μm. $Li_{10}SnP_2S_{12}$ ceramic powder (ranging in particle size between 39-75 microns) was dispersed onto polymer layer. An external pressure of 35 kg/cm$^2$ was applied to the sample for 1 minute. The resulting composite was passed under UV light (web speed 5 ft/min) to cure the polymer. The composite was flexible and no cracks were observed if bent. Impedance measurement showed a dry ionic conductivity of $4.9*10^{-10}$ S/cm.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
an electrode comprising:
an electroactive layer, wherein the electroactive layer comprises an electroactive material; and
a composite layer adjacent the electroactive layer, the composite layer comprising a polymeric material and a plurality of particles embedded within the polymeric material, wherein for at least a portion of the plurality of particles each particle has a largest cross-sectional dimension greater than an average thickness of the polymeric material within the composite layer, wherein for at least a portion of the plurality of particles each particle has a first portion of the particle in direct contact with and at least partially embedded within the electroactive layer and a second portion of the particle in direct contact with a liquid electrolyte, and wherein the composite layer is conductive to ions of the electroactive material.

2. An electrochemical cell as in claim 1, wherein the electroactive material comprises lithium metal.

3. An electrochemical cell as in claim 1, wherein the electroactive material has a surface roughness of at least 1 micron.

4. An electrochemical cell as in claim 1, wherein the polymeric material comprises an ion-conductive polymer.

5. An electrochemical cell as in claim 1, wherein the polymeric material comprises a non-ionically conductive polymer.

6. An electrochemical cell as in claim 1, wherein the polymeric material forms a reaction product with a surface of a component of the electrode, wherein the reaction product does not interfere with functionality of a layer including the polymeric material.

7. An electrochemical cell as in claim 1, wherein the polymeric material has an ionic conductivity in the liquid electrolyte of less than $10^{-8}$ S/cm.

8. An electrochemical cell as in claim 1, wherein for the at least a portion of the plurality of particles each particle comprises the first portion, which is in direct contact with the electroactive layer at a first surface of the composite layer, and the second portion, which is exposed at a second surface of the composite layer.

9. An electrochemical cell as in claim 1, wherein the plurality of particles have a minimum cross-sectional dimension of at least about 500 nm.

10. An electrochemical cell as in claim 1, wherein the plurality of particles comprise an inorganic material.

11. An electrochemical cell as in claim 1, wherein the plurality of particles comprise a material selected from aluminium oxide, silicon oxide, lithium oxide, $Li_{10}MP_2S_{12}$ wherein M is Sn, Ge, or Si, Garnet type ion conductive ceramics, and mixtures thereof.

12. An electrochemical cell as in claim 1, wherein the plurality of particles have an ionic conductivity of at least $10^{-5}$ S/cm.

13. An electrochemical cell as in claim 1, wherein the plurality of particles have an electronic conductivity of less than $10^{-10}$ S/cm.

14. An electrochemical cell as in claim 1, wherein the plurality of particles are organized.

15. An electrochemical cell as in claim 1, wherein the plurality of particles are disorganized.

16. An electrochemical cell as in claim 1, wherein the plurality of particles are non-porous.

17. An electrochemical cell as in claim 1, wherein the plurality of particles comprise a crosslinking polymer bound to a surface of the plurality of particles.

18. An electrochemical cell as in claim 1, wherein the volume occupied by the plurality of particles in the composite layer is greater than or equal to 10 vol % of the volume of the total composite layer.

19. An electrochemical cell as in claim 1, wherein the composite layer has an overall ionic conductivity of at least $10^{-5}$ S/cm.

20. The electrochemical cell of claim 1, wherein the electrochemical cell is a lithium-sulfur electrochemical cell.

21. An electrochemical cell as in claim 1, wherein the polymeric material does not swell more than about 10% of an initial volume of the polymeric material in an electrolyte solvent.

22. An electrochemical cell as in claim 1, wherein the polymeric material is capable of viscous flow at a temperature less than about 25° C.

23. An electrochemical cell as in claim 1, wherein an external pressure of greater than or equal to 50 kg/cm² is applied to the electrode.

24. An electrochemical cell as in claim 1, wherein the composite layer is configured to act as a barrier between the liquid electrolyte and the electroactive layer.

25. An electrochemical cell as in claim 1, further comprising a separator.

26. An electrochemical cell, comprising:
an electrode comprising:
- an electroactive layer comprising an electroactive material;
- a composite layer having a first surface adjacent the electroactive layer and a second surface, the composite layer comprising a polymeric material; and
- a plurality of particles embedded within the polymeric material of the composite layer, wherein at least a portion of the plurality of particles is in direct contact with and at least partially embedded within the electroactive layer at the first surface of the composite layer, and at least a portion of the plurality of particles is exposed at the second surface of the composite layer and in direct contact with a liquid electrolyte, and wherein the composite layer is conductive to ions of the electroactive material.

* * * * *

UNITED STATES PATENT AND TRADEMARK OFFICE
CERTIFICATE OF CORRECTION

| | |
|---|---|
| PATENT NO. | : 11,557,753 B2 |
| APPLICATION NO. | : 14/918672 |
| DATED | : January 17, 2023 |
| INVENTOR(S) | : Igor P. Kovalev et al. |

It is certified that error appears in the above-identified patent and that said Letters Patent is hereby corrected as shown below:

On the Title Page

Item (71), should remove BASF, SE as an Applicant.

Signed and Sealed this
Twenty-eighth Day of March, 2023

Katherine Kelly Vidal
*Director of the United States Patent and Trademark Office*